(12) United States Patent
Kim et al.

(10) Patent No.: US 8,462,196 B2
(45) Date of Patent: Jun. 11, 2013

(54) METHOD AND APPARATUS FOR GENERATING BLOCK-BASED STEREOSCOPIC IMAGE FORMAT AND METHOD AND APPARATUS FOR RECONSTRUCTING STEREOSCOPIC IMAGES FROM BLOCK-BASED STEREOSCOPIC IMAGE FORMAT

(75) Inventors: Yong-tae Kim, Seoul (KR); Jae-seung Kim, Seoul (KR); Moon-seok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1351 days.

(21) Appl. No.: 11/948,139

(22) Filed: Nov. 30, 2007

(65) Prior Publication Data
US 2008/0303892 A1 Dec. 11, 2008

Related U.S. Application Data

(60) Provisional application No. 60/943,151, filed on Jun. 11, 2007.

(30) Foreign Application Priority Data

Aug. 1, 2007 (KR) .......................... 10-2007-0077461

(51) Int. Cl.
*H04N 13/00* (2006.01)
(52) U.S. Cl.
USPC .............. 348/42; 348/E13.019; 348/E13.021; 348/E13.062; 348/744; 359/462; 345/204; 345/419; 382/238

(58) Field of Classification Search
USPC ............. 348/42, E13.019, E13.021, E13.062, 348/744; 359/462; 345/204, 419; 382/238
See application file for complete search history.

(56) References Cited

U.S. PATENT DOCUMENTS

| 6,075,556 | A | 6/2000 | Urano |
| 7,868,879 | B2* | 1/2011 | Rizko ........................... 345/204 |
| 2003/0190079 | A1* | 10/2003 | Penain et al. ................. 382/238 |
| 2004/0008893 | A1 | 1/2004 | Itoi et al. |
| 2004/0066846 | A1 | 4/2004 | Yun et al. |

(Continued)

FOREIGN PATENT DOCUMENTS

JP 11-103473 4/1999

OTHER PUBLICATIONS

Communication and Extended European Search Report issued Oct. 22, 2010, in counterpart European Application No. 08712209.9.

(Continued)

*Primary Examiner* — Kyung H Shin
(74) *Attorney, Agent, or Firm* — Sughrue Mion, PLLC

(57) ABSTRACT

Provided are a methods and apparatuses for generating a stereoscopic image format and reconstructing stereoscopic images from the stereoscopic image format. The method of generating a stereoscopic image format for compression or transmission of stereoscopic images includes receiving a base view image and an additional view image, determining block pixel information for the stereoscopic image format for each block position using first block pixel information of the base view image and second block pixel information of the additional view image based on blocks obtained by dividing the base view image and the additional view image, and disposing the determined block pixel information in each block position, thereby generating a combined image including pixel information of the base view image and pixel information of the additional view image.

21 Claims, 12 Drawing Sheets

U.S. PATENT DOCUMENTS

2005/0117637 A1    6/2005  Routhier et al.
2006/0082574 A1*   4/2006  Tsubaki .................... 345/419
2007/0195408 A1*   8/2007  Divelbiss et al. ........... 359/462
2008/0037656 A1*   2/2008  Hannuksela ............. 375/240.26

OTHER PUBLICATIONS

Breide, S. et al. "Speicherung Und Uebertragung Stereoskopischer Bewegtbilder", FKT Fernseh Und Kinotechnik, Fachverlag Schiele & Schon GMBH., Berlin, DE. vol. 53, No. 11, Nov. 1, 1999. pp. 674-683.

European Office Action issued in corresponding European Application No. 08712209.9 on Jul. 25, 2011.

Communication dated May 10, 2012 issued by the European Patent Office in counterpart European Application No. 08712209.9.

* cited by examiner

FIG. 1A (RELATED ART)

METHOD AND APPARATUS FOR GENERATING BLOCK-BASED STEREOSCOPIC IMAGE FORMAT AND METHOD AND APPARATUS FOR RECONSTRUCTING STEREOSCOPIC IMAGES FROM BLOCK-BASED STEREOSCOPIC IMAGE FORMAT

CROSS-REFERENCE TO RELATED PATENT APPLICATION

This application claims priority from Korean Patent Application No. 10-2007-0077461, filed on Aug. 1, 2007 in the Korean Intellectual Property Office, and U.S. Provisional Application No. 60/943,151, filed on Jun. 11, 2007, the disclosures of which are incorporated herein in their entirety by reference.

BACKGROUND OF THE INVENTION

1. Field of the Invention

Methods and apparatuses consistent with the present invention relate to generating a stereoscopic image format and reconstructing stereoscopic images, and more particularly, to generating a stereoscopic image format on a block basis in order to efficiently compress or transmit stereoscopic images composed of a base view image and an additional view image, and reconstructing the stereoscopic images from the block-based stereoscopic image format.

2. Description of the Related Art

Many methods have been proposed to transmit stereoscopic images. For example, for efficient transmission of stereoscopic images, standards such as Moving Picture Experts Group (MPEG)-2 Multiview Video Profile (MVP), depth map transmission using MPEG-4 Multiple Auxiliary Component (MAC), Multiview Video Coding (MVC) of MPEG-4 Advanced Video Coding (AVC)/H.264, and the like have been established.

However, those standard formats are not compatible with existing two-dimensional (2D) codecs. As a result, when stereoscopic images are transmitted using the standard formats, users of related art 2D reproduction devices cannot reconstruct the stereoscopic images by decoding received data. Moreover, many problems are anticipated in transmitting three-dimensional (3D) images using the standard formats under existing channel capacity conditions.

Thus, techniques for transmitting stereoscopic images after combining the stereoscopic images into one sheet of a combined image format have been developed. A side-by-side scheme and a top-bottom scheme are representative examples of these techniques. The former reduces the number of horizontal pixels of each of a left view image and a right view image by ½ and disposes the reduced left view image and the reduced right view image in a left and right portion of one sheet of a combined image, respectively. The latter reduces the number of vertical pixels of each of the left view image and the right view image by ½ and disposes the reduced left view image and the reduced right view image in a top and bottom portion of one sheet of a combined image, respectively.

However, combined images transmitted using these schemes have resolutions that are ½ those of the original left and right view images during the reduction process. Consequently, a related art 2D reproduction device shows only half of each of the left and right images, which may be displeasing for a viewer. Moreover, correlation between a left view image and a right view image of stereoscopic images is not considered during compression or transmission of a combined image, causing degradation in compression efficiency.

One sheet of an image format may also be generated by combining a left view image and a right view image on a pixel basis.

Figure 1A:
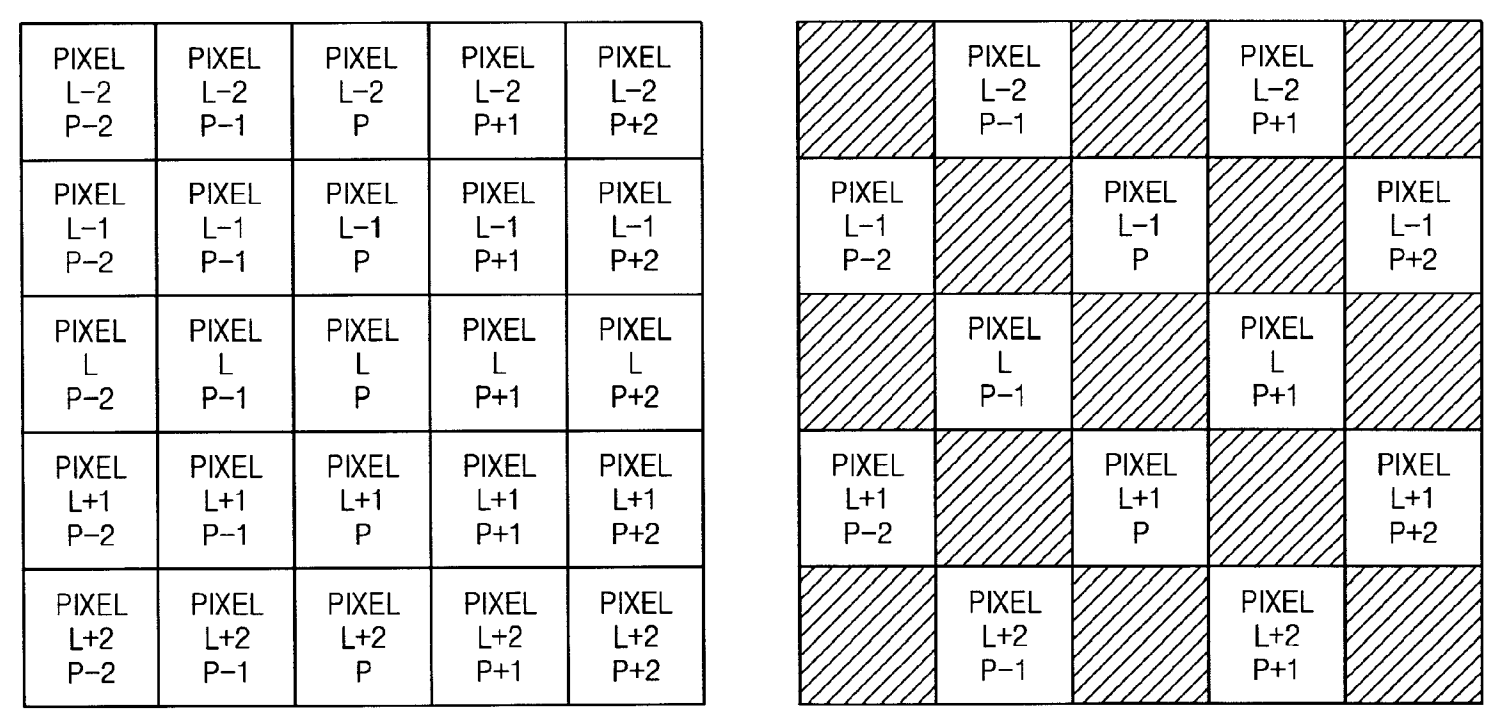

FIG. 1A illustrates a related art pixel-based stereoscopic image format for transmission of stereoscopic images.

In FIG. 1A, pixels of a left view image and a right view image of stereoscopic images are sampled on a lattice basis and the left view image is moved by one pixel in such a way that overlap between the left view image and the right view image is avoided, thereby generating one sheet of an image format for the stereoscopic images. The stereoscopic images are transmitted and received using related art 2D encoder and decoder. Since two sheets of the left view image and the right view image are generated into one sheet of a stereoscopic image format of the same resolution, some pixels may be lost.

FIG. 1B is a block diagram of an apparatus for restoring lost pixels of a pixel-based stereoscopic image format.

In order for a display device to reproduce an image with the original resolution, pixels that are lost during generation of the stereoscopic image format illustrated in FIG. 1A have to be restored. To this end, pixel values for each direction are extracted from images sampled on a pixel basis, a predetermined weight value is applied to each of the pixel values, and the weighted pixel values are summed up, thereby reconstructing the original left and right view images.

For transmission of stereoscopic images, an image format may be generated on a field basis.

FIG. 2A illustrates a related art field-based stereoscopic image format. In FIG. 2A, an input left view image and right view image are disposed in a vertical direction line by line and are then converted to a field-based format (including a top field and a bottom field for transmission and reception.

FIG. 2B is a block diagram of a related art transmission end and a reception end for a field-based stereoscopic image format.

Referring to FIG. 2B, a stereoscopic image pre-processor for generating and encoding a stereoscopic image format and a stereoscopic image post-processor for decoding a received stereoscopic image format to reconstruct stereoscopic images are illustrated. A left view image and a right view image converted to a field-based format are compressed by an MPEG encoder. Since MPEG standards other than MPEG-1 support field-based compression, the MPEG standards maintain compression efficiency during block-based Discrete Cosine Transformation (DCT), motion estimation, and disparity estimation.

In the pixel-based stereoscopic image format illustrated in FIG. 1A, a left view image and a right view image are combined on a pixel basis in order to generate one sheet of an image format. As a result, the performance of a DCT coder according to video standards, such as Joint Photographic Experts Group (JPEG), MPEG, H.26X, and the like, and compression efficiency degrade due to low correlation between pixels. Moreover, related art image formats including the formats illustrated in FIGS. 1A and 2A are not defined for a stereoscopic image pre-processor or a stereoscopic image post-processor. As a result, a left view image and a right view image are displayed one after another on a field basis when a stereoscopic image format is decoded, causing a viewer to experience a serious flickering effect.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for generating a stereoscopic image format, in which, in order to perform efficient compression or transmission of stereoscopic images composed of a base view image and an additional view image, a stereoscopic image format is generated by combining information of the base view image and information of the additional view image on a block basis, disparity between the base view image and the additional view image is estimated in consideration of correlation between the base view image and the additional view image, and disparity vector information is compressed and transmitted together with the stereoscopic image format.

The present invention also provides a method and apparatus for reconstructing stereoscopic images from a stereoscopic image format, in which a reference view image and an additional view image of the stereoscopic images are reconstructed in order to have their original resolutions by using a received block-based stereoscopic image format and extracted disparity vector information.

According to one aspect of the present invention, there is provided a method of generating a stereoscopic image format. The method includes determining blocks at first positions, from among predetermined-size blocks obtained by dividing a base view image, determining blocks of an additional view image corresponding to blocks of the base view image at second positions, which are different from the blocks at the first positions, and generating a combined image by combining the determined blocks of the base view image with the determined blocks of the additional view image.

When the combined image is composed of N rows and M columns, x is an integer that is greater than 0 and less than N/2, y is an integer that is greater than 0 and less than M/2, and a $(x, y, t)^{th}$ block indicates a block located $x^{th}$ from the left and $y^{th}$ from the top in a $t^{th}$ frame, the first positions may be positions of a $(2x, 2y, 2t)^{th}$ block, a $(2x+1, 2y+1, 2t)^{th}$ block, a $(2x, 2y+1, 2t+1)^{th}$ block, and a $(2x+1, 2y, 2t+1)^{th}$ block, and the second positions may be positions of a $(2x, 2y+1, 2t)^{th}$ block, a $(2x+1, 2y, 2t)^{th}$ block, a $(2x, 2y, 2t+1)^{th}$ block, and a $(2x+1, 2y+1, 2t+1)^{th}$ block.

The determination of the blocks of the additional view image may include determining blocks at the second positions in the additional view image.

The determination of the blocks of the additional view image may include estimating a disparity vector between a block of the base view image and a block of the additional view image, the blocks being located at the second positions and determining blocks that are a distance corresponding to the estimated disparity vector away from the second positions in the additional view image.

The method may further include inserting the disparity vector into the combined image.

The method may further include generating a disparity map having the disparity vector recorded therein.

The generation of the combined image may include disposing the determined blocks of the base view image in blocks at the first positions in the combined image and disposing the determined blocks of the additional view image in blocks at the second positions in the combined image.

The determination of the additional view image may include estimating a disparity vector between a block of the base view image and a block of the additional view image, the blocks being located at the second positions, determining blocks that are a distance corresponding to the estimated disparity vector away from the second positions in the additional view image, and reducing the determined blocks of the additional view image at a predetermined ratio, and the generation of the combined image comprises generating the combined image by combining pixel lines of the determined blocks of the base view image with pixel lines of the reduced blocks of the additional view image in order to construct blocks for the combined image.

When n is an integer that is greater than 0, the generation of the combined image may include disposing $2n^{th}$ lines of the determined blocks of the base view image in $2n^{th}$ lines of blocks of the combined image and disposing average values of the $2n^{th}$ lines of the determined blocks of the base view image and $n^{th}$ lines of the reduced blocks of the additional view image in $(2n+1)^{th}$ lines of the blocks of the combined image.

According to another aspect of the present invention, there is provided a method of reconstructing stereoscopic images. The method includes determining blocks at first positions and blocks at second positions, which are different from the blocks at the first positions, from among predetermined-size blocks obtained by dividing a combined image, generating a first preliminary image including the determined blocks at the first positions and a second preliminary image including the determined blocks at the second positions, and reconstructing a base view image and an additional view image by using the first preliminary image and the second preliminary image, respectively.

When the combined image is composed of N rows and M columns, x is an integer that is greater than 0 and less than N/2, y is an integer that is greater than 0 and less than M/2, and a $(x, y, t)^{th}$ block indicates a block located $x^{th}$ from the left and $y^{th}$ from the top in a $t^{th}$ frame, the first positions may be positions of a $(2x, 2y, 2t)^{th}$ block, a $(2x+1, 2y+1, 2t)^{th}$ block, a $(2x, 2y+1, 2t+1)^{th}$ block, and a $(2x+1, 2y, 2t+1)^{th}$ block, and the second positions may be positions of a $(2x, 2y+1, 2t)^{th}$ block, a $(2x+1, 2y, 2t)^{th}$ block, a $(2x, 2y, 2t+1)^{th}$ block, and a $(2x+1, 2y+1, 2t+1)^{th}$ block.

The generation of the first preliminary image and the second preliminary image may include disposing the determined blocks at the first positions in the first positions of the first preliminary image and disposing the determined blocks at the second positions in the second positions of the second preliminary image.

The generation of the first preliminary image and the second preliminary image may include extracting a disparity vector from between a block of the base view image and a block of the additional view image, disposing the determined blocks at the first positions of the first preliminary image, and disposing the determined blocks at the second positions in positions that are a distance corresponding to the estimated disparity vector away from the second positions.

The reconstruction of the base view image and the additional view image may include estimating a motion vector between different-time frames of the first preliminary image for the blocks at the second positions in the first preliminary image, and disposing blocks of the different-time frames, which are a distance corresponding to the estimated motion vector away from the second positions, in the second positions of the base view image.

The reconstruction of the base view image and the additional view image may include estimating a motion vector between different-time frames of the second preliminary image for the blocks at the first positions in the second preliminary image, and disposing blocks of the different-time frames, which are a distance corresponding to the estimated motion vector away from the first positions, in the first positions of the additional view image.

The reconstruction of the base view image and the additional view image may include estimating a disparity vector between the first preliminary image and the second preliminary image for the blocks at the second positions in the first preliminary image and disposing blocks of the second preliminary image, which are a distance corresponding to the estimated disparity vector away from the second positions, in the second positions of the base view image.

The reconstruction of the base view image and the additional view image may include estimating a disparity vector between the first preliminary image and the second preliminary image for the blocks at the first positions in the second preliminary image and disposing blocks of the first preliminary image, which are a distance corresponding to the estimated disparity vector away from the first positions, in the first positions of the additional view image.

The extraction of the disparity vector may include extracting the disparity vector inserted into the combined image by using watermarking.

The extraction of the disparity vector may include extracting the disparity vector inserted into a predetermined region of the combined image.

The extraction of the disparity vector may include extracting the disparity vector from a bitstream in which the combined image is compressed and recorded.

The extraction of the disparity vector may include extracting the disparity vector from a disparity map.

According to another aspect of the present invention, there is provided a method of reconstructing stereoscopic images. The method includes determining pixel lines at a first position and pixel lines at a second position, which are different from the pixel lines at the first position, from predetermined-size blocks obtained by dividing a combined image, reconstructing a base view image by constructing blocks using the pixel lines at the first position, and reconstructing an additional view image by constructing blocks using the pixel lines at the first position and the pixel lines at the second position.

When n is an integer that is greater than 0, the first position is a position of a $2n^{th}$ line, and a position of a $(2n+1)^{th}$ line, the reconstruction of the base view image may include disposing $2n^{th}$ pixel lines of the blocks of the combined image in $2n^{th}$ pixel lines of the blocks of the base view image and reconstructing $(2n+1)^{th}$ pixel lines of the blocks of the base view image by performing interpolation using the $2n^{th}$ pixel lines or $(2n+2)^{th}$ pixel lines of the blocks of the base view image.

When n is an integer that is greater than 0, the first position is a position of a $2n^{th}$ line, and a position of a $(2n+1)^{th}$ line, the reconstruction of the additional view image may include disposing values obtained by subtracting pixel values of $2n^{th}$ pixel lines of the blocks of the base view image from two times pixel values of $(2n+1)^{th}$ pixel lines of the combined image in $(2n+1)^{th}$ pixel lines of the blocks of the additional view image and reconstructing $2n^{th}$ pixel lines of the blocks of the additional view image by performing interpolation using $(2n-1)^{th}$ pixel lines or the $(2n+1)^{th}$ pixel lines of the blocks of the additional view image.

According to another aspect of the present invention, there is provided a method of encoding a stereoscopic image format composed of blocks in N rows and M columns. When x is an integer that is greater than 0 and less than N/2 and y is an integer that is greater than 0 and less than M/2, the method includes constructing a first slice by disposing a $(2x, 2y)^{th}$ block and a $(2x+1, 2y+1)^{th}$ block, constructing a second slice by disposing a $(2x, 2y+1)^{th}$ block and a $(2x+1, 2y)^{th}$ block, and encoding the first slice and the second slice using block-based encoding.

According to another aspect of the present invention, there is provided an apparatus for generating a stereoscopic image format. The apparatus includes a base view image block determination unit determining, from among predetermined-size blocks obtained by dividing a base view image, blocks at first positions, an additional view image block determination unit determining blocks of an additional view image corresponding to blocks of the base view image at second positions, which are different from the blocks at the first positions, and a combined image generation unit generating a combined image by combining the determined blocks of the base view image with the determined blocks of the additional view image.

According to another aspect of the present invention, there is provided an apparatus for reconstructing stereoscopic images. The apparatus includes a block determination unit determining blocks at first positions and blocks at second positions, which are different from the first positions, from among predetermined-size blocks obtained by dividing a combined image, a preliminary image generation unit generating a first preliminary image including the determined blocks at the first positions and a second preliminary image including the determined blocks at the second positions, and an image reconstruction unit reconstructing a base view image and an additional view image using the first preliminary image and the second preliminary image, respectively.

According to another aspect of the present invention, there is provided a computer-readable recording medium having recorded thereon a program for executing the method of generating a stereoscopic image format.

According to another aspect of the present invention, there is provided a computer-readable recording medium having recorded thereon a program for executing the method of reconstructing stereoscopic images.

According to another aspect of the present invention, there is provided a computer-readable recording medium having recorded thereon a program for executing the method of encoding a stereoscopic image format.

BRIEF DESCRIPTION OF THE DRAWINGS

The above and other aspects of the present invention will become more apparent by describing in detail exemplary embodiments thereof with reference to the attached drawings in which:

FIG. 1A illustrates a related art pixel-based stereoscopic image format for transmission of stereoscopic images;

DETAILED DESCRIPTION OF THE INVENTION

Figure 1B:
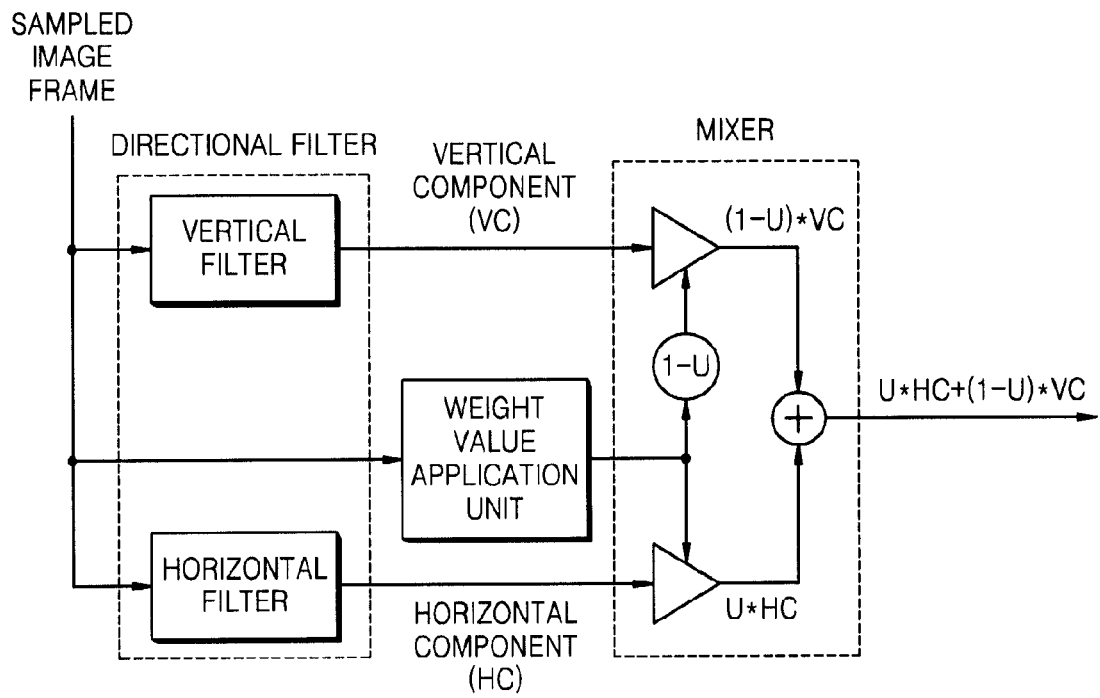
FIG. 1B is a related art block diagram of an apparatus for restoring lost pixels of a pixel-based stereoscopic image format.
Figure 2A:
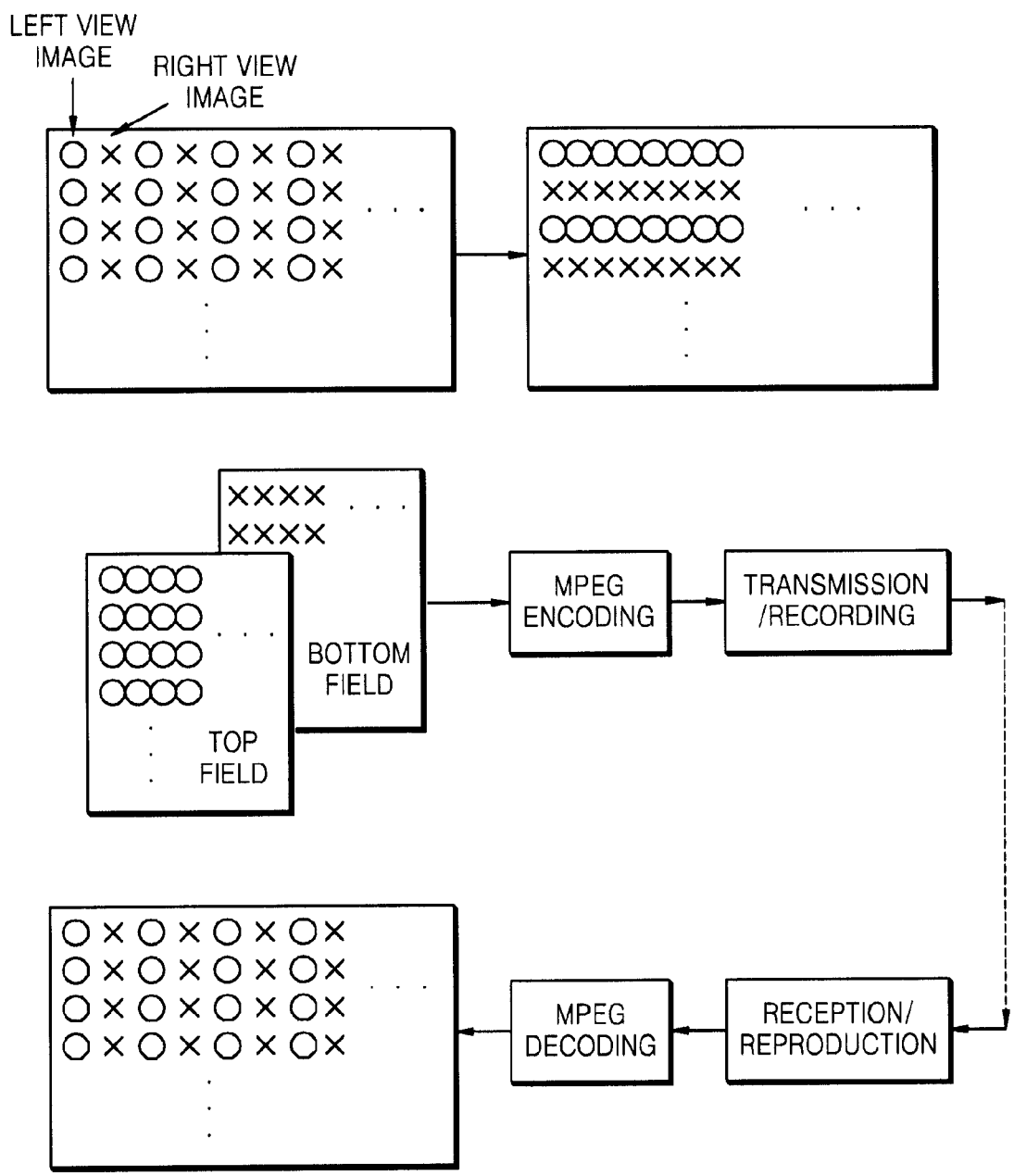
FIG. 2A illustrates a related art field-based stereoscopic image format.
Figure 2B:
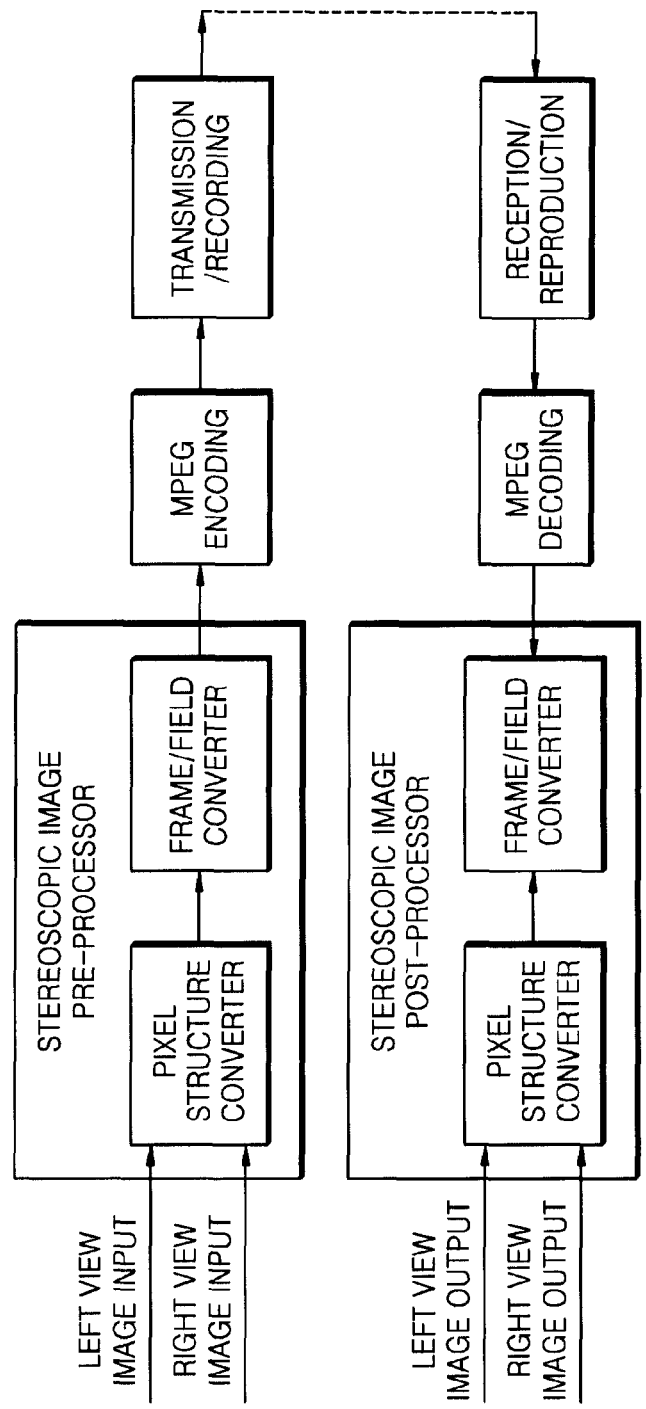
FIG. 2B is a related art block diagram of a transmission end and a reception end of a field-based stereoscopic image format.

Hereinafter, exemplary embodiments of the present invention will be described in detail with reference to the accompanying drawings. It should be noted that like reference numerals refer to like elements illustrated in one or more of the drawings. In the following description of the present invention, detailed description of known functions and configurations incorporated herein will be omitted for conciseness and clarity.

Figure 3A:
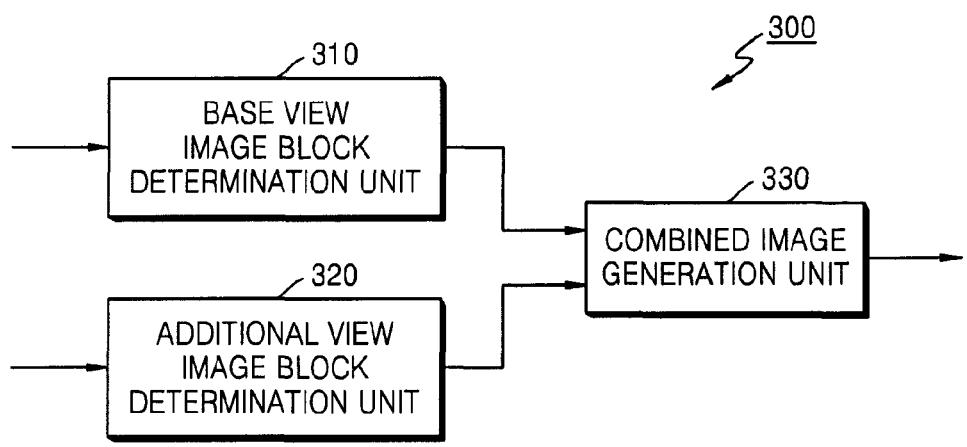
FIG. 3A is a block diagram of an apparatus for generating a stereoscopic image format according to an exemplary embodiment of the present invention.

FIG. 3A is a block diagram of an apparatus 300 for generating a stereoscopic image format according to an exemplary embodiment of the present invention.

Referring to FIG. 3A, the apparatus 300 includes a base view image block determination unit 310, an additional view image block determination unit 320, and a combined image generation unit 330.

The base view image block determination unit 310 receives a base view image, determines blocks at first positions from among predetermined-size blocks obtained by dividing the base view image, and outputs the determined blocks at the first positions to the combined image generation unit 330.

The additional view image block determination unit 320 receives an additional view image, determines blocks at second positions, which are different from the blocks at the first positions, from among predetermined-size blocks obtained by dividing the additional view image, and outputs the determined blocks at the second positions to the combined image generation unit 330.

The combined image generation unit 330 receives the determined blocks of the base view image from the base view image block determination unit 310 and the determined blocks of the additional view image from the additional view image block determination unit 320, and combines the received blocks, thereby generating a combined image.

In an exemplary embodiment of the present invention, the resolution of the combined image is the same as that of the base view image and the additional view image.

A block position means the spatial position of the current block in the current frame and the temporal position of the current block relative to frames preceding and following the current frame. In an exemplary embodiment of the present invention, pixel information of a base view image block and an additional view image block that are located in the same position as the position of the current block of the combined image is reflected in the current block of the combined image.

Block determination performed by the base view image block determination unit 310 and the additional view image block determination unit 320 and a function of the combined image generation unit 330 for generating a combined image in a stereoscopic image format will be described later in detail with reference to FIG. 5A.

Figure 3B:
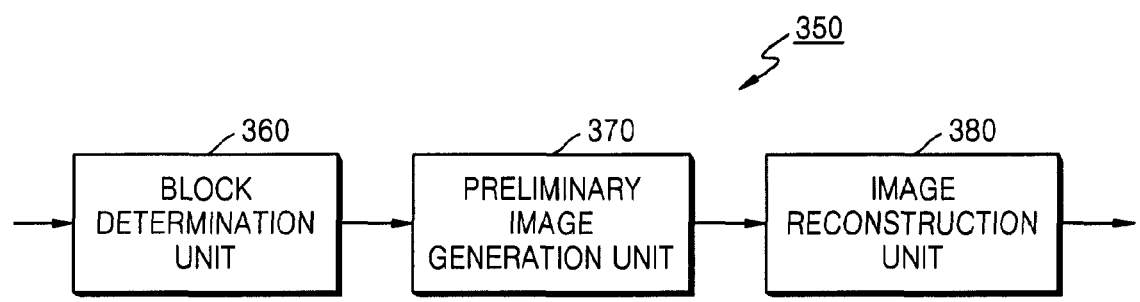
FIG. 3B is a block diagram of an apparatus for reconstructing stereoscopic images according to an exemplary embodiment of the present invention.

FIG. 3B is a block diagram of an apparatus 350 for reconstructing stereoscopic images according to an exemplary embodiment of the present invention.

Referring to FIG. 3B, the apparatus 350 includes a block determination unit 360, a preliminary image generation unit 370, and an image reconstruction unit 380.

The block determination unit 360 receives a combined image, determines blocks at first positions and blocks at second positions, which are different from the blocks at the first positions, from among predetermined-size blocks obtained by dividing the combined image, and outputs the determined blocks to the preliminary image generation unit 370.

The preliminary image generation unit 370 receives the determined blocks of the combined image from the block determination unit 360 in order to generate a first preliminary image including the blocks at the first positions and a second preliminary image including the blocks at the second positions, and outputs the first preliminary image and the second preliminary image to the image reconstruction unit 380.

The image reconstruction unit 380 receives the first preliminary image and the second preliminary image from the preliminary image generation unit 370 and reconstructs the base view image and the additional view image using the first preliminary image and the second preliminary image, respectively.

In an exemplary embodiment of the present invention, the resolutions of the base view image and the additional view image that are reconstructed from the combined image are the same as those of the original base view image and the original additional view image at the reception end.

The functions of the block determination unit 360, the preliminary image generation unit 370, and the image reconstruction unit 380 for reconstruction of stereoscopic images will be described later in detail with reference to FIG. 5B.

Figure 4:
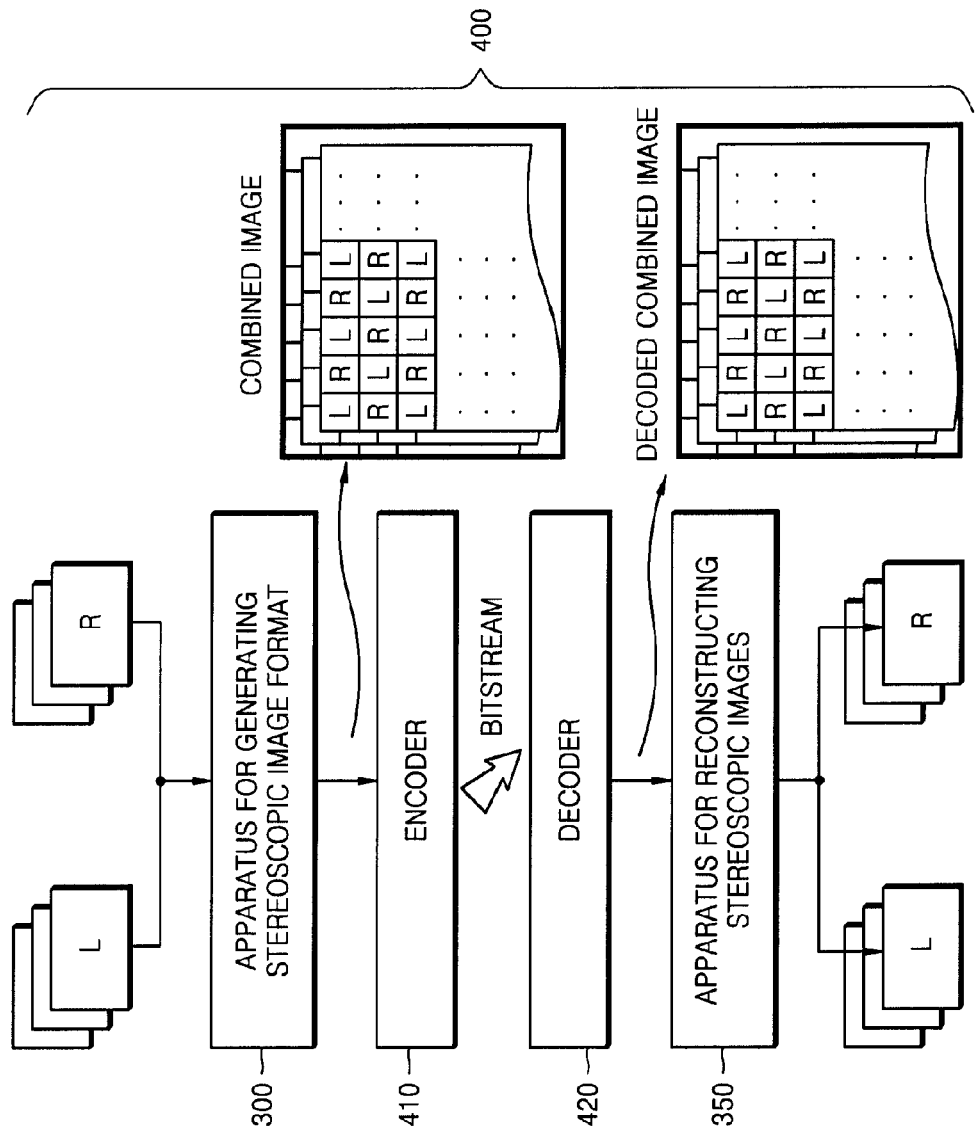
FIG. 4 illustrates a stereoscopic image system including the apparatus for generating a stereoscopic image format and the apparatus for reconstructing stereoscopic images according to an exemplary embodiment of the present invention.

FIG. 4 illustrates a stereoscopic image system 400 including the apparatus 300 for generating a stereoscopic image format and the apparatus 350 for reconstructing stereoscopic images according to an exemplary embodiment of the present invention.

The stereoscopic image system 400 includes the apparatus 300, an encoder 410, a decoder 420, and the apparatus 350.

The apparatus 300 for generating a stereoscopic image format receives a base view image and an additional view image of stereoscopic images, generates a combined image obtained by combining the base view image and the additional view image on a block basis according to an exemplary embodiment of the present invention, and outputs the generated combined image to the encoder 410.

The encoder 410 encodes the combined image input from the apparatus 300 using block-based image compression and transmission, thereby outputting a bitstream. The block-based image compression and transmission may be, for example, MPEG-4.

The decoder 420 decodes the input bitstream using block-based image compression and transmission in order to generate a combined image, and outputs the generated combined image to the apparatus 350 for reconstructing stereoscopic images.

The apparatus 350 reconstructs the base view image and the additional view image on a block basis according to an exemplary embodiment of the present invention by using the combined image input from the decoder 420.

Figure 5A:
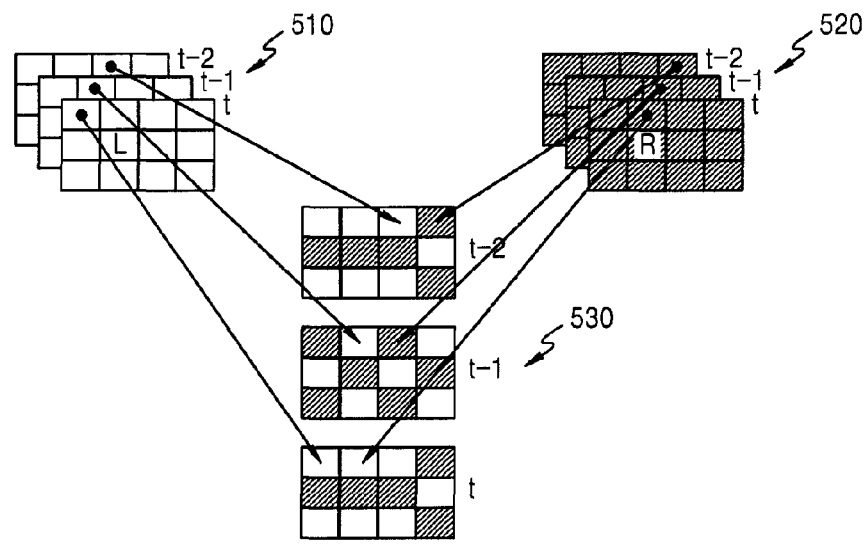
FIG. 5A is a view for explaining a method of generating a block-based stereoscopic image format according to an exemplary embodiment of the present invention.

FIG. 5A is a view for explaining a method of generating a block-based stereoscopic image format according to an exemplary embodiment of the present invention.

Hereinafter, operations of the base view image block determination unit 310, the additional view image block determination unit 320, and the combined image generation unit 330 of the apparatus 300 for generating a stereoscopic image format will be described in detail with reference to FIG. 5A.

An image 510 is a base view image including $(t-2)^{th}$, $(t-1)^{th}$, and $t^{th}$ frames.

An image 520 is an additional view image including $(t-1)^{th}$, $(t-1)^{th}$, and $t^{th}$ frames.

An image 530 is a combined image obtained by combining the base view image 510 and the additional view image 520 on a block basis.

In an exemplary embodiment of the present invention, a left view image is selected as the base view image 510 and a right view image is selected as the additional view image 520.

In the present invention, an image is divided into predetermined-size blocks for block-based image processing. In other words, the apparatus 300 for generating a stereoscopic image format combines information of the base view image 510 and information of the additional view image 520 on a block basis, thereby generating the combined image 530.

For convenience of explanation, it is assumed that each of the base view image 510, the additional view image 520, and the combined image 530 can be divided into blocks in N rows and M columns, x is an integer that is greater than 0 and less than N/2, y is an integer that is greater than 0 and less than M/2, t is an integer that is greater than 0, and a $(x, y, t)^{th}$ block indicates a block located $x^{th}$ from the left and $y^{th}$ from the top in a $t^{th}$ frame.

In an exemplary embodiment of the present invention, blocks at predetermined positions of the base view image 510 or the additional view image 520 are determined and are arranged in the combined image 530, thereby generating the combined image 530.

For example, the base view image block determination unit 310 determines a $(2x, 2y, 2t)^{th}$ block, a $(2x+1, 2y+1, 2t)^{th}$ block, a $(2x, 2y+1, 2t+1)^{th}$ block, and a $(2x+1, 2y, 2t+1)^{th}$ block of the base view image 510 for the combined image 530.

The additional view image block determination unit 320 determines a $(2x, 2y+1, 2t)^{th}$ block, a $(2x+1, 2y, 2t)^{th}$ block, a $(2x, 2y, 2t+1)^{th}$ block, and a $(2x+1, 2y+1, 2t+1)^{th}$ block of the additional view image 520 for the combined image 530.

In an exemplary embodiment of the present invention, the combined image generation unit 330 disposes the blocks determined by the base view image block determination unit 310 and the additional view image block determination unit 320 in the same positions in the combined image 530 as their original positions. In other words, the determined blocks of the base view image 510 are disposed in a $(2x, 2y, 2t)^{th}$ block, a $(2x+1, 2y+1, 2t)^{th}$ block, a $(2x, 2y+1, 2t+1)^{th}$ block, and a $(2x+1, 2y, 2t+1)^{th}$ block of the combined image 530, and the determined blocks of the additional view image 520 are disposed in a $(2x, 2y+1, 2t)^{th}$ block, a $(2x+1, 2y, 2t)^{th}$ block, a $(2x, 2y, 2t+1)^{th}$ block, and a $(2x+1, 2y+1, 2t+1)^{th}$ block of the combined image 530.

The determined blocks of the additional view image 520 are disposed in positions located above, below, to the left of and to the right of the determined blocks of the base view image 510 in the current frame and in the same positions in frames preceding and following the current frame as the positions of the determined blocks of the base view image 510. Thus, blocks of the same-view image are not consecutively disposed in the combined image 530.

Such disposition of non-consecutive blocks is intended to make it possible to use information of a neighboring block during a stereoscopic image reconstruction process by disposing a block of a different-view image as the neighboring block. The positions of the determined blocks of the base view image 510 and the additional view image 520 may vary according to various embodiments as long as blocks of the same-view image are disposed non-consecutively.

Figure 5B:
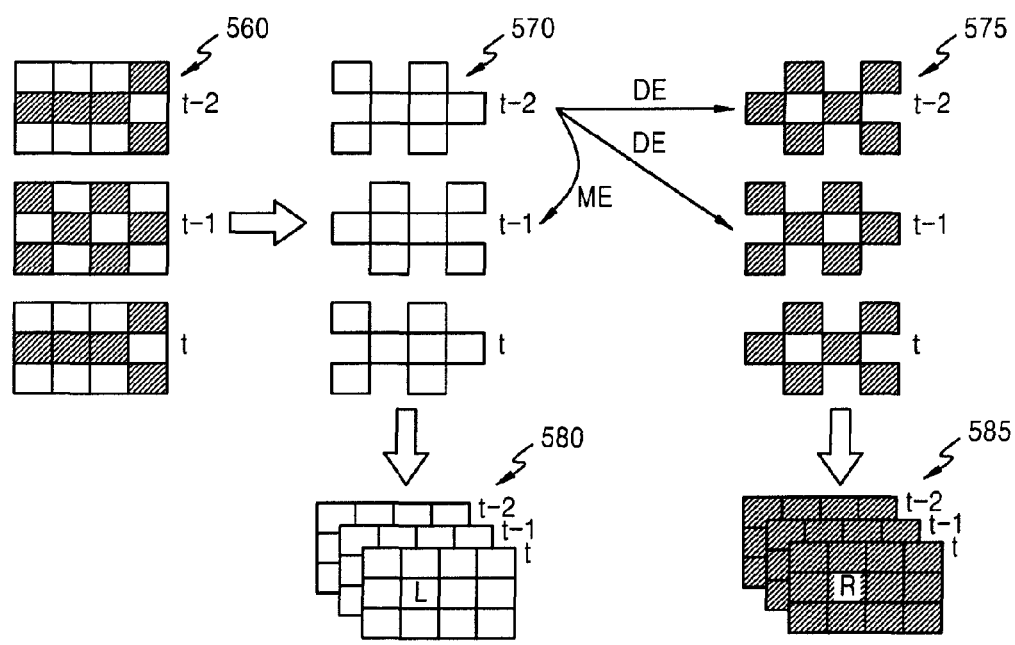
FIG. 5B is a view for explaining a method of reconstructing stereoscopic images from a block-based stereoscopic image format according to an exemplary embodiment of the present invention.

FIG. 5B is a view for explaining a method of reconstructing stereoscopic images from a block-based stereoscopic image format according to an exemplary embodiment of the present invention.

The preliminary image generation unit 370 and the image reconstruction unit 380 of the apparatus 350 for reconstructing stereoscopic images will now be described in detail with reference to FIG. 5B.

An image 560 is a decoded combined image.

An image 570 is a first preliminary image extracted from the combined image 560.

An image 575 is a second preliminary image extracted from the combined image 560.

An image 580 is a base view image reconstructed from the first preliminary image 570.

An image 590 is an additional view image reconstructed from the second preliminary image 575.

The block determination unit 360 determines blocks for the first preliminary image 570 and blocks for the second preliminary image 575. This determination process is similar to a stereoscopic image format generation process.

For example, for the first preliminary image 570, a $(2x, 2y, 2t)^{th}$ block, a $(2x+1, 2y+1, 2t)^{th}$ block, a $(2x, 2y+1, 2t+1)^{th}$ block, and a $(2x+1, 2y, 2t+1)^{th}$ block of the combined image 560 are determined.

For the second preliminary image 575, a $(2x, 2y+1, 2t)^{th}$ block, a $(2x+1, 2y, 2t)^{th}$ block, a $(2x, 2y, 2t+1)^{th}$ block, and a $(2x+1, 2y+1, 2t+1)^{th}$ block of the combined image 560 are determined.

The preliminary image generation unit 370 generates the first preliminary image 570 and the second preliminary image 575 by disposing the blocks of the combined image 560 determined by the block determination unit 360. In an exemplary embodiment of the present invention, the determined blocks of the combined image 560 are disposed in the same positions in the first preliminary image 570 as their original positions.

In other words, the determined blocks of the combined image 560 for the first preliminary image 570 are disposed in the positions of a $(2x, 2y, 2t)^{th}$ block, a $(2x+1, 2y+1, 2t)^{th}$ block, a $(2x, 2y+1, 2t+1)^{th}$ block, and a $(2x+1, 2y, 2t+1)^{th}$ block of the first preliminary image 570, and the remaining blocks of the combined image 560 (the determined blocks of the combined image 560 for the second preliminary image 575) are disposed in the same positions in the second preliminary image 575 as their original positions. Thus, even when the determined blocks of the combined image 560 are disposed in block positions of the first preliminary image 570 and the second preliminary image 575, only a half of all blocks of each of the first preliminary image 570 and the second preliminary image 575 are occupied.

In an exemplary embodiment of the present invention, the image reconstruction unit 380 disposes the blocks of the first preliminary image 570 and the second preliminary image 575 generated by the preliminary image generation unit 370 in corresponding block positions of the base view image 580 and the additional view image 585.

For the remaining blocks, except for blocks of the first preliminary image 570 or the second preliminary image 575, which are occupied by the blocks of the combined image 560, the image reconstruction unit 380 uses motion estimation/compensation and disparity estimation/compensation.

Since the apparatus 300 for generating a stereoscopic image format or the apparatus 350 for reconstructing stereoscopic images according to an exemplary embodiment of the present invention disposes blocks of different-view images one after another, motion estimation/compensation and disparity estimation/compensation can be used with neighboring blocks of the current block.

In motion estimation according to an exemplary embodiment of the present invention, a block having the smallest difference compared to the occupied current block of the current frame in the first preliminary image 570 is detected from among blocks of a preceding or following frame of the first preliminary image 570 and a distance between the detected block and the current block is determined as a motion vector. Pixel values of an empty block of the first preliminary image 570 are determined using an occupied block of the preceding or following frame of the first preliminary image 570 by means of the motion vector determined by motion estimation.

In disparity estimation according to an exemplary embodiment of the present invention, a block having the smallest difference than the current block of the first preliminary image 570 is detected from among blocks of the current, preceding or following frame of the second preliminary image 575 and a distance between the detected block and the current block is determined as a disparity vector. Pixel values of an empty block of the second preliminary image 575 are determined using an occupied block of the current, preceding, or following frame of the second preliminary image 575 by means of the disparity vector determined by disparity estimation.

Figure 6:
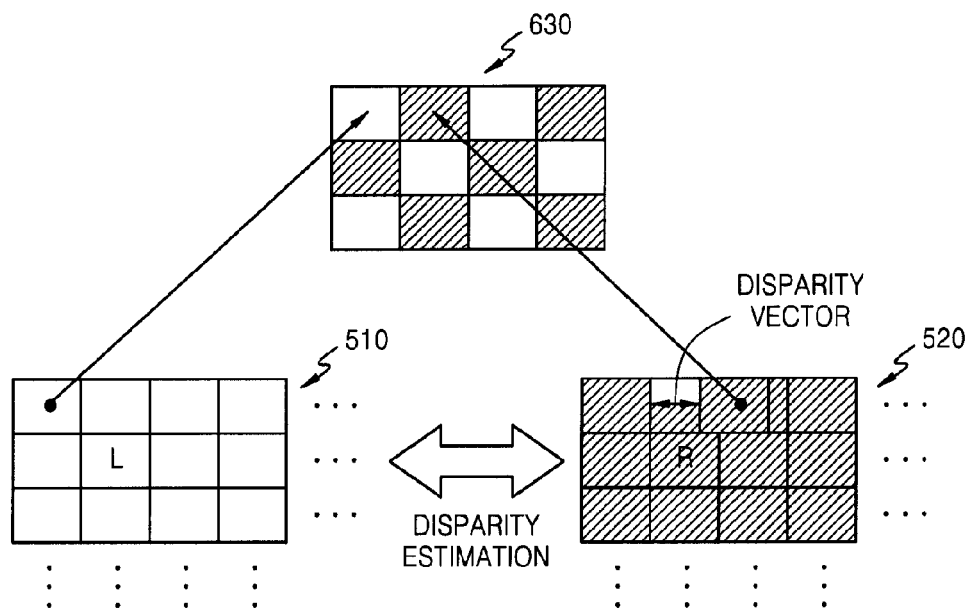
FIG. 6 is a view for explaining a method of generating a block-based stereoscopic image format using a disparity vector between a base view image and an additional view image according to an exemplary embodiment of the present invention.

FIG. 6 is a view for explaining a method of generating a block-based stereoscopic image format using a disparity vector between a base view image and an additional view image according to an exemplary embodiment of the present invention.

The additional view image block determination unit 320 and the combined image generation unit 330 of the apparatus 300 for generating a stereoscopic image format according to an exemplary embodiment of the present invention will now be described with reference to FIG. 6.

An image 510 and an image 520 are a base view image and an additional view image, respectively.

An image 630 is a combined image obtained by combining the base view image 510 and the additional view image 520 using disparity vector information according to an exemplary embodiment of the present invention.

According to an exemplary embodiment of the present invention, the additional view image block determination unit 320 uses disparity estimation between blocks of the base view image 510 and the additional view image 520 for reconstruction of stereoscopic images that enable natural 3D image reproduction. In other words, the additional view image block determination unit 320 estimates a disparity vector between a block at the second positions in the base view image 510, and a block at the second positions in the additional view image 520, and determines blocks that are a distance corresponding to the estimated disparity vector away from the second positions in the additional view image.

Since a block of the additional view image 520, which has the smallest difference compared to a block of the base view image 510 at a corresponding position, is determined as a block to be disposed in the combined image 630 by means of disparity estimation, the combined image 630 has block information that is most similar to the base view image 510.

The operation processes of the base view image block determination unit 310 and the combined image generation unit 330 are the same as those in FIG. 5A.

In an exemplary embodiment where the combined image 630 is generated by using disparity vector information between the base view image 510 and the additional view image 520, the disparity vector information has to be transmitted together with image information for accurate reconstruction at the reception end.

In an exemplary embodiment of the present invention, the disparity vector information is inserted into the combined image 630 using watermarking. In another exemplary embodiment of the present invention, the disparity vector information is inserted into a predetermined region of the combined image 630. In still another exemplary embodiment of the present invention, the disparity vector information is inserted into a bitstream in which the combined image is compressed and then recorded. In yet another exemplary embodiment of the present invention, a disparity map having the disparity vector information recorded therein is generated and transmitted together with image information.

A method of reconstructing an image format according to the exemplary embodiment illustrated in FIG. 6 is the same as that illustrated in FIG. 5B. In other words, the first preliminary image 570 and the second preliminary image 575 are extracted from the decoded combined image 560, and the base view image 580 and the additional view image 585 are reconstructed by motion estimation/compensation and disparity estimation/compensation using the first preliminary image 570 and the second preliminary image 575.

However, the apparatus 350 for reconstructing stereoscopic images according to the current exemplary embodiment of the present invention receives disparity vector information as well as image information.

In an exemplary embodiment of the present invention, disparity vector information inserted into a combined image using watermarking is extracted. In another exemplary embodiment of the present invention, the disparity vector information inserted into a predetermined region of the combined image is extracted. In still another exemplary embodiment of the present invention, the disparity vector information is extracted from a bitstream in which the combined image is compressed and then recorded. In yet another exemplary embodiment of the present invention, the disparity vector information is extracted from the disparity map is transmitted together with image information.

Using an extracted disparity vector according to various exemplary embodiments of the present invention, the image reconstruction unit 380 disposes a block of the second preliminary image 575 in a block position that is a distance corresponding to the estimated disparity vector away from a corresponding block position when it reconstructs the additional view image 585. Like in FIG. 5B, the remaining blocks of the reconstructed additional view image 585, except for blocks in which blocks of the second preliminary image 575 are disposed, are occupied using motion estimation/compensation and disparity estimation/compensation.

Hereinafter, a method of generating a stereoscopic image format and a method of reconstructing stereoscopic images according to another exemplary embodiment of the present invention will be described with reference to FIGS. 7A through 7C.

Figure 7A:
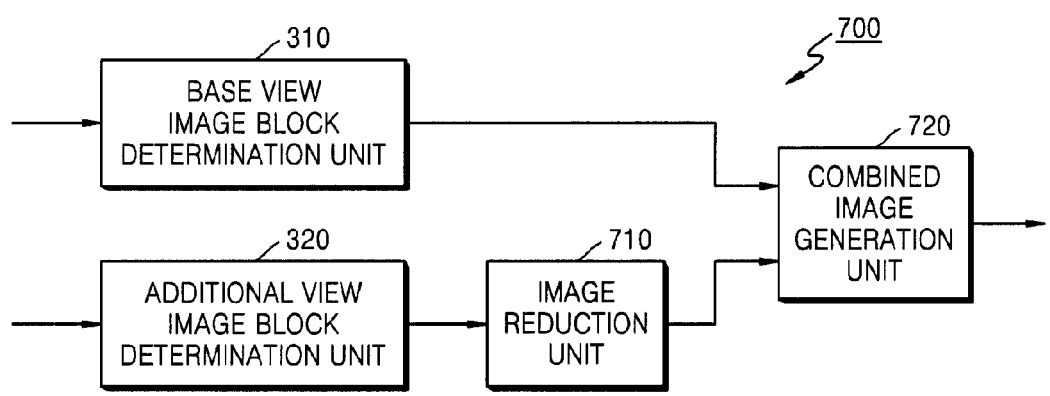
FIG. 7A is a block diagram of an apparatus for generating a block-based stereoscopic image format according to another exemplary embodiment of the present invention.

FIG. 7A is a block diagram of an apparatus 700 for generating a block-based stereoscopic image format according to another exemplary embodiment of the present invention.

Referring to FIG. 7A, the apparatus 700 includes the base view image block determination unit 310, the additional view image block determination unit 320, an image reduction unit 710, and a combined image generation unit 720.

The base view image block determination unit 310 and the additional view image block determination unit 320 of the apparatus 700 are implemented in the same manner as with the base view image block determination unit 310 and the additional view image block determination unit 320 of the apparatus 300 for generating a stereoscopic image format illustrated in FIG. 3.

The image reduction unit 710 reduces blocks of an additional view image, which are determined by the additional view image block determination unit 320, at a predetermined ratio and outputs the reduced determined blocks.

The combined image generation unit 720 receives blocks of a base view image, which are determined by the base view image block determination unit 310 and the blocks of the additional view image, which are determined by the additional view image block determination unit 320 and then are reduced by the image reduction unit 710, and combines pixel lines of the determined blocks of the base view image with pixel lines of the reduced blocks of the additional view image block in order to construct blocks for a combined image, thereby generating the combined image.

A method of generating the combined image by combining the pixel lines of the blocks of the base view image with the pixel lines of the blocks of the additional view image by the combined image generation unit 720 will be described later with reference to FIG. 7B.

Figure 7B:
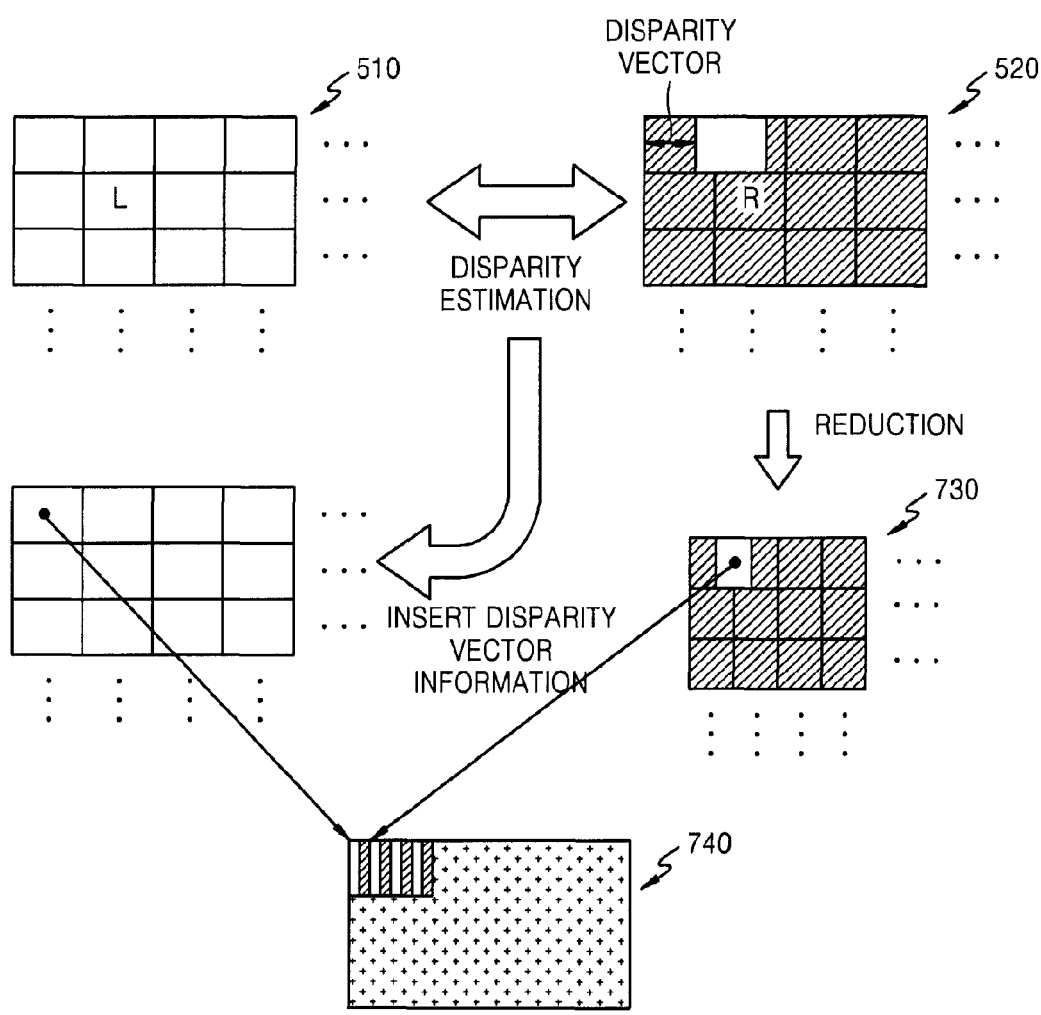
FIG. 7B is a view for explaining a method of generating a block-based stereoscopic image format including both information of a base view image and information of an additional view image in a single block according to the exemplary embodiment in FIG. 7A according to an exemplary embodiment of the present invention.

FIG. 7B is a view for explaining a method of generating a stereoscopic image format including both base view image information and additional view image information in a single block.

The image reduction unit 710 and the combined image generation unit 330 of the apparatus 700 according to an exemplary embodiment of the present invention will now be described in detail with reference to FIG. 7B.

An image 510 is a base view image, and an image 520 is an additional view image.

An image 730 is a reduced image of the additional view image 520.

An image 740 is a combined image obtained by adding block information of the additional view image 520 to block information of the base view image 510 according to an exemplary embodiment of the present invention.

In the apparatus 700 for generating a stereoscopic image format according to an exemplary embodiment of the present invention, the combined image generation unit 720 alternately combines each pixel line of the base view image 510 and each pixel line obtained by combining information of the base view image 510 with information of the additional view image 520, with a corresponding pixel line of the combined image 740 for each block.

The additional view image 520 uses the image 730 that is reduced at a predetermined ratio in the horizontal or vertical direction. The direction used for reduction is perpendicular to the direction of lines of the base view image 510 and the additional view image 520 for the combined image 740. In an exemplary embodiment of the present invention, the reduced image 730 obtained by reducing the additional view image 520 at a ratio of 1:2 in the horizontal direction is used.

According to an exemplary embodiment of the present invention, for an even-numbered vertical line of a block of the combined image 740, the combined image generation unit 720 selects a pixel line in the same line position and in the same block position as those in the combined image 740 from the base view image 510.

For an odd-numbered vertical line of the block of the combined image 730, the combined image generation unit 720 selects pixel values obtained by linearly combining pixel values of a line of a block of the base view image 510 in the same block position and in the same line position as those in the combined image 730 with pixel values of a line of a block of the additional view image 520 corresponding to the line of the base view image 510. The combined image generation unit 720 selects the average value of the pixel values of the base view image 510 and the pixel lines of the additional view image 520 as pixel values for the combined image 730 as follows:

$$I_{mix}(i,j)=(L(i,j-1)+R_{down}(i,j/2)+1)/2 \qquad (1),$$

where I indicates the combined image 730, L indicates a left view image as the base view image 510, R indicates a right view image as the additional view image 520, $R_{down}$ indicates a reduced image of R, and i is an integer from 0 to N−1 and j is an integer from 0 to N−2 when N is a positive integer.

According to an exemplary embodiment of the present invention, in order to determine a block of the additional view image 520 to be used for generation of the combined image 730, the additional view image block determination unit 320 obtains disparity vector information by performing disparity estimation between a block of the base view image 510 and a block of the additional view image 520. Based on the disparity vector information, a block of the additional view image 520 which is most similar to the base view image 510 at the current block position is selected.

If a mismatch between different-view images, such as inaccurate disparity estimation, occurs in a stereoscopic image format where the different-view images are combined per line, the different-view images are displayed one after another line-by-line or pixel-by-pixel, resulting in degradation in subjective display quality.

On the other hand, in the method of generating a stereoscopic image format according to an exemplary embodiment of the present invention as in FIG. 7B, correlation between the base view image 510 and the combined image 730 is improved by disposing pixel lines obtained by combining the base view image 510 and the additional view image 520 in the combined image 730 instead of directly disposing pixel lines of the additional view image 520. In addition, a difference between the base view image 510 and the combined image 730 is further reduced using disparity estimation.

Figure 7C:
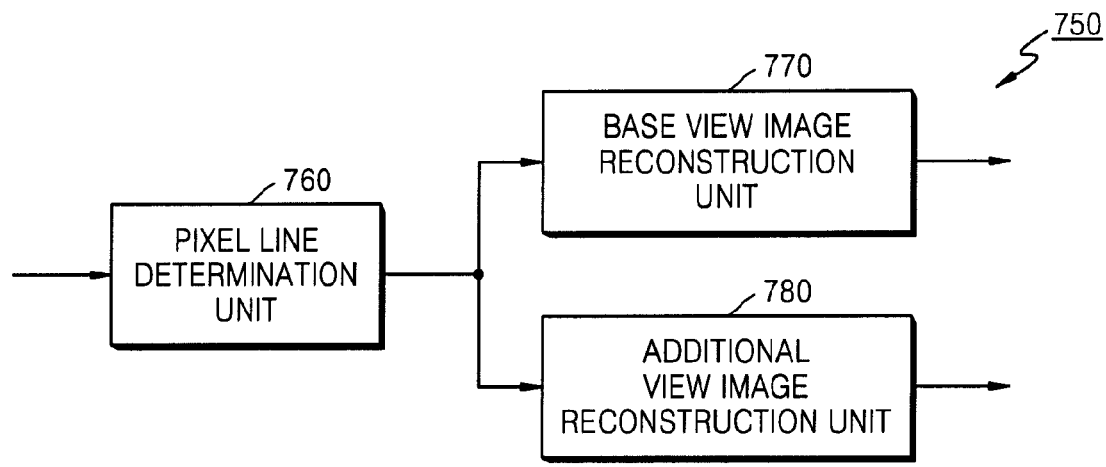
FIG. 7C is a block diagram of an apparatus for reconstructing stereoscopic images according to another exemplary embodiment of the present invention.

FIG. 7C is a block diagram of an apparatus 750 for reconstructing stereoscopic images according to another exemplary embodiment of the present invention.

The apparatus 750 includes a pixel line determination unit 760, a base view image reconstruction unit 770, and an additional view image reconstruction unit 780.

The pixel line determination unit 760 receives a combined image, determines pixel lines at a first position and pixel lines at a second position, which are different from the pixel lines at the first position, from predetermined-size blocks that are obtained by dividing the combined image, and outputs the determined pixel lines to the base view image reconstruction unit 770 and the additional view image reconstruction unit 780.

The base view image reconstruction unit 770 constructs blocks using the pixel lines at the first position determined by the pixel line determination unit 760, thereby reconstructing a base view image.

The additional view image reconstruction unit 780 constructs blocks using the pixel lines at the second position determined by the pixel line determination unit 760, thereby reconstructing an additional view image.

The apparatus 750 uses interpolation in order to reconstruct a stereoscopic image format generated by the apparatus 700 for generating the stereoscopic image format.

For example, when n is an integer greater than 0, the first position is the position of a $2n^{th}$ pixel line, and the second position is the position of a $(2n+1)^{th}$ pixel line, the base view image reconstruction unit 370 disposes $2n^{th}$ pixel lines of blocks of a combined image in $2n^{th}$ pixel lines of blocks of the base view image. Next, $(2n+1)^{th}$ pixel lines of the blocks of the base view image are reconstructed by interpolation using the $2n^{th}$ pixel lines or $(2n+2)^{th}$ pixel lines of the blocks of the base view image. In the interpolation, a linear average value of the values of neighboring pixels of the current pixel may be selected as the value of the current pixel.

According to an exemplary embodiment of the present invention, the additional view image reconstruction unit 780 disposes values obtained by subtracting pixel values of the $2n^{th}$ pixel lines of the blocks of the base view image from doubled pixel values of $(2n+1)^{th}$ pixel lines of blocks of the combined image in $(2n+1)^{th}$ pixel lines of blocks of an additional view image. Next, $2n^{th}$ pixel lines of the blocks of the additional view image are reconstructed by interpolation using $(2n-1)^{th}$ pixel lines or $(2n+1)^{th}$ pixel lines of the blocks of the additional view image.

The additional view image reconstruction unit 780 reconstructs the reduced additional view image using pixel lines of the combined image as follows:

$$R'_{down}(i,j/2)=2\times I'_{mix}(i,j+1)-L'(i,j)-1 \quad (2),$$

where $R'_{down}$ indicates a second reconstruction image having a reduced resolution, L' indicates a first reconstruction image, $I'_{mix}$ indicates a decoded combined image, and i is an integer from 0 to N−1 and j is an integer from 0 to N−2 when N is a positive integer.

According to an exemplary embodiment of the present invention, the second preliminary image and the reduced-resolution second reconstruction image have resolutions that are half that of the original additional view image, and thus their resolutions have to be doubled in the horizontal or vertical direction. The direction for the resolution recovery is the same as the direction for the reduction used in the generation of the stereoscopic image format according to an exemplary embodiment of the present invention. The image reconstruction unit 380 uses interpolation for the resolution recovery.

For example, according to an exemplary embodiment of the present invention, the image reconstruction unit 380 disposes a pixel line of a block of the reduced additional view image in an even-numbered line of each block of the additional view image and disposes a linear average value of pixel values of neighboring even-numbered lines of an odd-numbered line of the additional view image in the odd-numbered line of the additional view image.

When the apparatus 300 for generating a stereoscopic image format uses a block of an additional view image by means of disparity estimation, the image reconstruction unit 780 of the apparatus 750 for reconstructing stereoscopic images has to consider disparity vector information estimated during generation of the additional view image. Thus, the image reconstruction unit 780 extracts disparity vector information from the combined image and moves the block of the additional view image based on the motion vector information.

Figure 8:
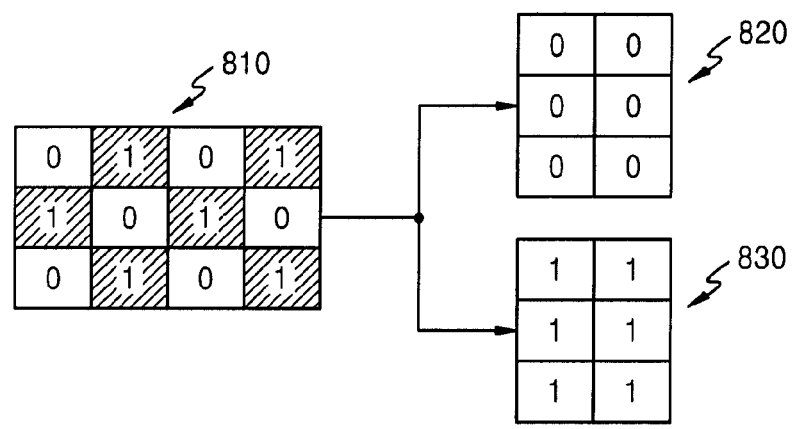
FIG. 8 is a view for explaining a method of encoding a stereoscopic image format generated according to an exemplary embodiment of the present invention.

FIG. 8 is a view for explaining a method of encoding a stereoscopic image format generated according to an exemplary embodiment of the present invention.

An image 810 is a combined image where blocks of a base view image and blocks of an additional view image are arranged using a dispersed map scheme. A block marked with '0' includes block information of the base view image and a block marked with '1' includes block information of the additional view image.

An image 820 is a slice including only base view image blocks '0' from among the entire blocks of the combined image 810.

An image 830 is a slice including only additional view image blocks '1' from among the entire blocks of the combined image 810.

Flexible Macroblock Ordering (FMO) supported by Arbitrary Slice Ordering (ASO) implemented in a H.264 baseline profile supports the dispersed map scheme. Thus, a stereoscopic image format generated based on each block of the base view image and the additional view image according to an exemplary embodiment of the present invention can be compressed and transmitted according to H.264. In other words, the slice 820 including only the blocks '0' and the slice 830 including only the blocks '1' are constructed, and encoding is performed on a slice basis, thereby efficiently encoding the base view image and the additional view image.

Figure 9A:
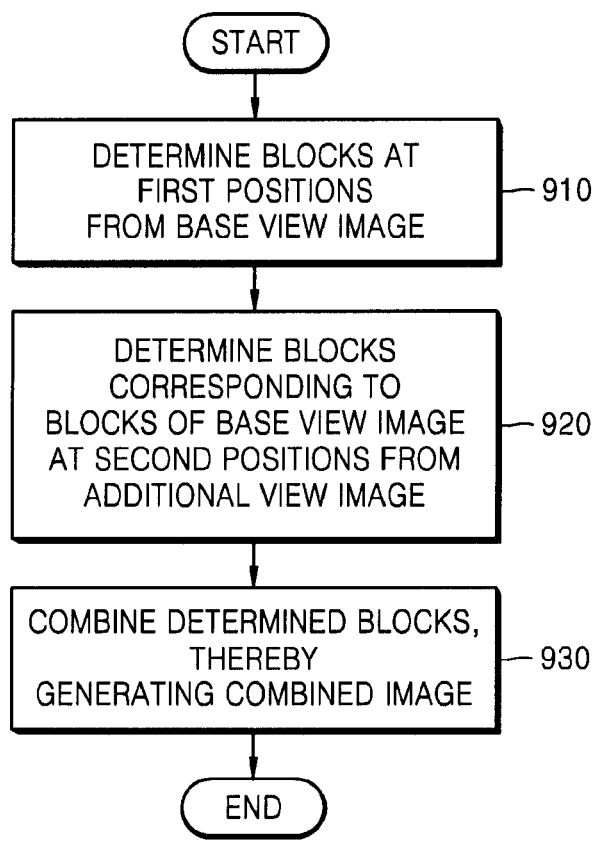
FIG. 9A is a flowchart illustrating a method of generating a stereoscopic image format according to an exemplary embodiment of the present invention.

FIG. 9A is a flowchart illustrating a method of generating a stereoscopic image format according to an exemplary embodiment of the present invention.

In operation 910, blocks of a base view image at first positions are determined from among predetermined-size blocks obtained by dividing the base view image.

In operation 920, blocks of an additional view image corresponding to blocks of the base view image at second positions, which are different from the blocks at the first positions, are determined.

In operation 930, the blocks of the base view image determined in operation 910 and the blocks of the additional view image determined in operation 920 are combined, thereby generating a combined image.

Figure 9B:
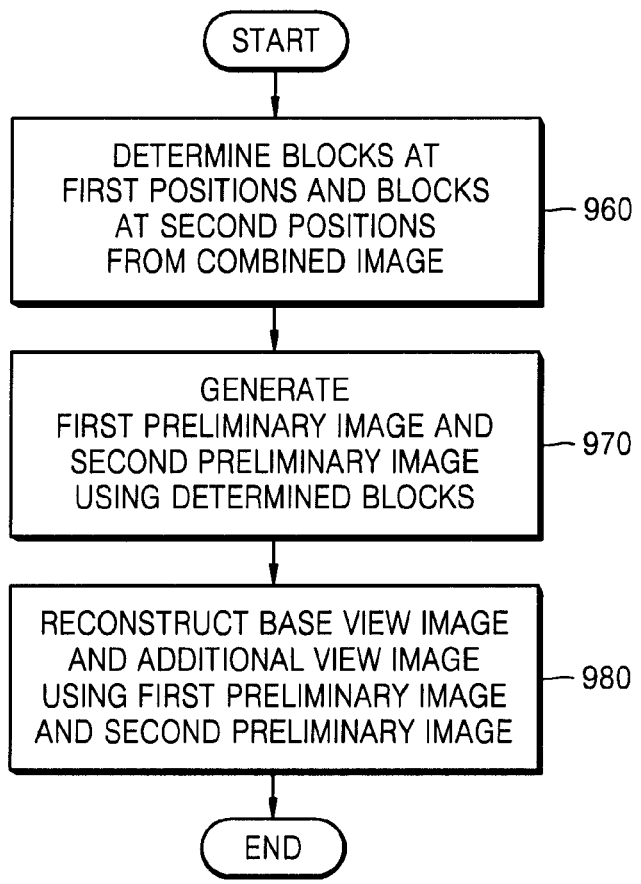
FIG. 9B is a flowchart illustrating a method of reconstructing stereoscopic images according to an exemplary embodiment of the present invention.

FIG. 9B is a flowchart illustrating a method of reconstructing stereoscopic images according to an exemplary embodiment of the present invention.

In operation 960, blocks at first positions and blocks at second positions, which are different from the blocks at the first positions, are determined from among predetermined-size blocks obtained by dividing a combined image.

In operation 970, a first preliminary image including the determined blocks at the first positions and a second preliminary image including the determined blocks at the second positions are generated.

In operation 980, a base view image and an additional view image are reconstructed using the first preliminary image and the second preliminary image, respectively.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs. The present invention is also applicable to broadcasting systems.

The method and apparatus for generating a stereoscopic image format according to the present invention includes information of both a base view image and an additional view image of stereoscopic images in a combined image obtained by alternately combining the base view image and the additional view image. Since the information of the base view image with the information of the additional view image are combined on a block basis, block-based compression/communication standards can be applied to the information, thereby allowing efficient image compression.

Moreover, the method and apparatus for generating a stereoscopic image format according to the present invention improves compression efficiency during generation of the stereoscopic image format by performing disparity estimation, and accurately reconstructs stereoscopic images during a post-processing procedure that is performed after processing at a reception end. Furthermore, disparity vector information is inserted into image information without the need for another channel, thereby enabling a decoder of a related art 2D image device to read the stereoscopic image format according to the present invention.

The method and apparatus for reconstructing stereoscopic images according to the present invention extracts some blocks of the base view image and the additional view image from the combined image and reconstructs the remaining blocks using motion compensation and disparity compensation. As such, since all blocks of the stereoscopic images are reconstructed, the original resolutions of the stereoscopic images are maintained and the stereoscopic images are more accurately reconstructed by disparity compensation and motion compensation.

Additionally, more efficient encoding can be achieved by constructing the stereoscopic image format according to the present invention as independent slices including blocks of different-view images and decoding the same.

The method of generating the stereoscopic image format and a method of decoding the stereoscopic image format can be applied to a stereoscopic digital television (TV), a stereoscopic Personal Computer (PC) monitor, a stereoscopic camcorder, and a stereoscopic Digital Broadcasting (DB) player.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method of reconstructing stereoscopic images, the method comprising:
   determining, using a computer processor, first blocks at first positions and second blocks at second positions, which are different from the first blocks at the first positions, from among blocks obtained by dividing a combined image;
   generating a first preliminary image including the first blocks at the first positions and a second preliminary image including the second blocks at the second positions; and
   reconstructing a base view image and an additional view image based on the first preliminary image and the second preliminary image, respectively,
   wherein the second blocks of the additional view image are disposed in positions located above, below, to the left, and to the right of the first blocks of the base view image in the combined image in a current frame and in the same positions in frames preceding and following the current frame so that blocks of the same-view are not consecutively disposed in the combined image.

2. The method of claim 1, wherein the combined image is composed of N rows and M columns, x is an integer that is greater than 0 and less than N/2, y is an integer that is greater than 0 and less than M/2, t is an integer that is greater than 0, and a $(x, y, t)^{th}$ block indicates a block located $x^{th}$ from the left and $y^{th}$ from the top in a $t^{th}$ frame,
   the first positions are positions of a $(2x, 2y, 2t)^{th}$ block, a $(2x+1, 2y+1, 2t)^{th}$ block, a $(2x, 2y+1, 2t+1)^{th}$ block, and a $(2x+1, 2y, 2t+1)^{th}$ block, and
   the second positions are positions of a $(2x, 2y+1, 2t)^{th}$ block, a $(2x+1, 2y, 2t)^{th}$ block, a $(2x, 2y, 2t+1)^{th}$ block, and a $(2x+1, 2y+1, 2t+1)^{th}$ block.

3. The method of claim 1, wherein the generating the first preliminary image and the second preliminary image comprises:
   disposing the first blocks at the first positions in the first positions of the first preliminary image; and
   disposing the second blocks at the second positions in the second positions of the second preliminary image.

4. The method of claim 1, wherein the generating the first preliminary image and the second preliminary image comprises:
   extracting a disparity vector from between a block of the base view image and a block of the additional view image;
   disposing the first blocks at the first positions of the first preliminary image; and
   disposing the second blocks at the second positions in positions at a distance corresponding to the estimated disparity vector away from the second positions.

5. The method of claim 4, wherein the extracting the disparity vector comprises extracting the disparity vector inserted into the combined image by using watermarking.

6. The method of claim 4, wherein the extracting the disparity vector comprises extracting the disparity vector inserted into a predetermined region of the combined image.

7. The method of claim 4, wherein the extracting the disparity vector comprises extracting the disparity vector from a bitstream in which the combined image is compressed and recorded.

8. The method of claim 4, wherein the extracting the disparity vector comprises extracting the disparity vector from a disparity map.

9. The method of claim 1, wherein the reconstructing the base view image and the additional view image comprises:
   estimating a motion vector between different-time frames of the first preliminary image for the second blocks at the second positions in the first preliminary image;
   disposing blocks of different-time frames, at a distance corresponding to the estimated motion vector away from the second positions, in the second positions of the base view image.

10. The method of claim 1, wherein the reconstructing the base view image and the additional view image comprises:
   estimating a motion vector between different-time frames of the second preliminary image for the first blocks at the first positions in the second preliminary image;
   disposing blocks of the different-time frames, at a distance corresponding to the estimated motion vector away from the first positions, in the first positions of the additional view image.

11. The method of claim 1, wherein the reconstructing the base view image and the additional view image comprises:
   estimating a disparity vector between the first preliminary image and the second preliminary image for the second blocks at the second positions in the first preliminary image; and
   disposing blocks of the second preliminary image, at a distance corresponding to the estimated disparity vector away from the second positions, in the second positions of the base view image.

12. The method of claim 1, wherein the reconstructing the base view image and the additional view image comprises:
   estimating a disparity vector between the first preliminary image and the second preliminary image for the first blocks at the first positions in the second preliminary image; and
   disposing blocks of the first preliminary image, which are a distance corresponding to the estimated disparity vector away from the first positions, in the first positions of the additional view image.

13. The method of claim 1, wherein the determined second blocks at the second positions are offset in at least one of a row direction and a column direction compared with the determined first positions of the first blocks for a predetermined frame.

14. The method of claim 13, wherein the determined second blocks at the second positions correspond to same spatial positions of the first positions of the determined first blocks for at least one of a frame preceding and a frame following the predetermined frame.

15. The method of claim 14, wherein the second positions for the predetermined frame are offset in both the row and column direction compared to the first positions.

16. A method of reconstructing stereoscopic images, the method comprising:
   determining, using a computer processor, first pixel lines at a first position and second pixel lines at a second position, which are different from the first pixel lines at the first position, from blocks obtained by dividing a combined image;
   reconstructing a base view image by constructing blocks based on the first pixel lines at the first position; and
   reconstructing an additional view image by constructing blocks based on the first pixel lines at the first position and the second pixel lines at the second position,
   wherein the second blocks of the additional view image are disposed in positions located above, below, to the left, and to the right of the first blocks of the base view image in the combined image in a current frame and in the same positions in frames preceding and following the current frame so that blocks of the same-view image are not consecutively disposed in the combined image.

17. The method of claim 16, wherein the reconstructing the base view image comprises:
   disposing $2n^{th}$ pixel lines of the blocks of the combined image in $2n^{th}$ pixel lines of the blocks of the base view image, wherein n is an integer that is greater than 0, the first position is a position of a $2n^{th}$ line, and a position of a $(2n+1)^{th}$ line; and
   reconstructing $(2n+1)^{th}$ pixel lines of the blocks of the base view image by performing interpolation using the $2n^{th}$ pixel lines or $(2n+2)^{th}$ pixel lines of the blocks of the base view image.

18. The method of claim 16, wherein the reconstructing the additional view image comprises:
   disposing values obtained by subtracting pixel values of $2n^{th}$ pixel lines of the blocks of the base view image from two times pixel values of $(2n+1)^{th}$ pixel lines of the combined image in $(2n+1)^{th}$ pixel lines of the blocks of the additional view image, wherein n is an integer that is greater than 0, the first position is a position of a $2n^{th}$ line, and a position of a $(2n+1)^{th}$ line; and
   reconstructing $2n^{th}$ pixel lines of the blocks of the additional view image by performing interpolation using $(2n-1)^{th}$ pixel lines or the $(2n+1)^{th}$ pixel lines of the blocks of the additional view image.

19. A method of encoding a stereoscopic image format composed of blocks in N rows and M columns, the method comprising:
   determining first blocks of a base view image at first positions from among predetermined-size blocks obtained by dividing the base view image;
   determining second blocks of an additional view image corresponding to blocks of the base view image at second positions, which are different from the blocks at the first positions;
   generating a combined image by combining the first blocks of the base view image and the second blocks of the additional view image;
   constructing a first slice by disposing a $(2x, 2y)^{th}$ block and a $(2x+1, 2y+1)^{th}$ block of the combined image, wherein x is an integer that is greater than 0 and less than N/2 and y is an integer that is greater than 0 and less than M/2;
   constructing a second slice by disposing a $(2x, 2y+1)^{th}$ block and a $(2x+1, 2y)^{th}$ block of the combined image; and
   encoding the first slice and the second slice using block-based encoding,
   wherein the second blocks of the additional view image are disposed in positions located above, below, to the left, and to the right of the first blocks of the base view image in the combined image in a current frame and in the same positions in frames preceding and following the current frame so that blocks of the same-view image are not consecutively disposed in the combined image.

20. An apparatus for reconstructing stereoscopic images, the apparatus comprising:
   a block determination unit which determines first blocks at first positions and second blocks at second positions, which are different from the first blocks at the first positions, from among blocks obtained by dividing a combined image;
   a preliminary image generation unit which generates a first preliminary image including the determined first blocks at the first positions and a second preliminary image including the determined second blocks at the second positions; and
   an image reconstruction unit which reconstructs a base view image and an additional view image using the first preliminary image and the second preliminary image, respectively, wherein at least one of the block determination unit, the preliminary image generation unit, and the image reconstruction unit is implemented by a hardware processor, and wherein the second blocks of the additional view image are disposed in positions located above, below, to the left, and to the right of the first blocks of the base view image in the combined image in a current frame and in the same positions in frames preceding and following the current frame so that blocks of the same-view image are not consecutively disposed in the combined image.

21. A non-transitory computer-readable recording medium having recorded thereon a program for executing a method of reconstructing stereoscopic images, the method comprising:

determining first blocks at first positions and second blocks at second positions, which are different from the first blocks at the first positions, from among blocks obtained by dividing a combined image;

generating a first preliminary image including the first blocks at the first positions and a second preliminary image including the second blocks at the second positions; and reconstructing a base view image and an additional view image by using the first preliminary image and the second preliminary image, respectively, wherein the second blocks of the additional view image are disposed in positions located above, below, to the left, and to the right of the first blocks of the base view image in the combined image in a current frame and in the same positions in frames preceding and following the current frame so that blocks of the same-view image are not consecutively disposed in the combined image.

* * * * *